(12) United States Patent
Higuchi (10) Patent No.: US 10,272,623 B2
(45) Date of Patent: *Apr. 30, 2019

(54) SHEET MANUFACTURING APPARATUS (71) Applicant: SEIKO EPSON CORPORATION, Tokyo (JP)

(72) Inventor: Naotaka Higuchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,287

(22) Filed: Aug. 25, 2017

(65) Prior Publication Data

US 2018/0043644 A1   Feb. 15, 2018

Related U.S. Application Data

(63) Continuation of application No. 15/073,953, filed on Mar. 18, 2016, now Pat. No. 9,776,365.

(30) Foreign Application Priority Data

Mar. 30, 2015   (JP) .................................. 2015-069453

(51) Int. Cl.
*D21H 23/28*   (2006.01)
*B29D 7/01*   (2006.01)
(Continued)

(52) U.S. Cl.
CPC ............... *B29D 7/01* (2013.01); *B29C 43/32* (2013.01); *B29C 43/34* (2013.01); *B29C 43/52* (2013.01); *B29C 65/02* (2013.01); *B29C 69/001* (2013.01); *D21F 9/00* (2013.01); *D21H 23/28* (2013.01); *B29C 2043/3416* (2013.01);
(Continued)

(58) Field of Classification Search
USPC ....................................................... 162/164.1
See application file for complete search history.

(56) References Cited

U.S. PATENT DOCUMENTS 3,741,863 A   6/1973   Hunter et al.
9,315,941 B2   4/2016   Gomi et al.
(Continued)

FOREIGN PATENT DOCUMENTS

JP   49-6263 A   1/1974
JP   2002-144305 A   5/2002
JP   2015-136878 A   7/2015

OTHER PUBLICATIONS

The Extended European Search Report for the corresponding European Application No. 16161591.9 dated Jun. 30, 2016.

*Primary Examiner* — Mark Halpern (57) ABSTRACT

A sheet manufacturing apparatus includes an impeller mill defibrating, in a dry process, a raw material containing a fiber, a mixer mixing a defibrated material and a resin, using an air stream to produce a mixture of the defibrated material and the resin, a sieve having an opening through which the mixture passes, a belt, a heater, and a nozzle. The mixture is accumulated on an upper side of the belt to form a web. The heater heats the web to form a sheet so that the fiber is bonded by the resin. The nozzle is arranged between the belt and the heater and applies a liquid to a partial portion of the web so that bonding between the fiber and the resin in a first portion of the sheet is weaker than bonding between the fiber and the resin in a second portion of the sheet.

4 Claims, 6 Drawing Sheets (51) Int. Cl.

| | |
|---|---|
| *D21F 9/00* | (2006.01) |
| *B29C 43/32* | (2006.01) |
| *B29C 43/34* | (2006.01) |
| *B29C 43/52* | (2006.01) |
| *B29C 65/02* | (2006.01) |
| *B29C 69/00* | (2006.01) |
| *B29K 1/00* | (2006.01) |
| *B29K 105/00* | (2006.01) |
| *B29K 105/26* | (2006.01) |
| *D21B 1/06* | (2006.01) |

(52) U.S. Cl.
CPC .... *B29K 2001/00* (2013.01); *B29K 2105/251* (2013.01); *B29K 2105/26* (2013.01); *D21B 1/06* (2013.01)

(56) References Cited

U.S. PATENT DOCUMENTS

| | | |
|---|---|---|
| 9,776,365 B2 * | 10/2017 | Higuchi ................. B29C 43/34 |
| 2007/0292217 A1 | 12/2007 | Karpik |
| 2014/0027075 A1 | 1/2014 | Yamagami et al. |
| 2014/0290884 A1 | 10/2014 | Yamagami et al. |
| 2014/0290886 A1 | 10/2014 | Nagai et al. |
| 2014/0290888 A1 | 10/2014 | Gomi et al. |
| 2014/0290890 A1 | 10/2014 | Seki et al. |
| 2015/0204015 A1 | 7/2015 | Gomi et al. |

\* cited by examiner

SHEET MANUFACTURING APPARATUS

CROSS-REFERENCE TO RELATED APPLICATIONS

This application is a continuation application of U.S. patent application Ser. No. 15/073,953, filed on Mar. 18, 2016. This application claims priority to Japanese Patent Application No. 2015-069453 filed on Mar. 30, 2015. The entire disclosures of U.S. patent application Ser. No. 15/073,953 and Japanese Patent Application No. 2015-069453 are hereby incorporated herein by reference.

BACKGROUND

Technical Field

The present invention relates to a sheet manufacturing apparatus, a sheet manufacturing method, and a sheet.

Related Art

Making a sheet or film-shaped forming by accumulating a fibrous substance and causing a binding force to act between the fibers of the accumulated fibrous substance is an old technology. A typical example of this technology is manufacture of paper by a pulp papermaking (paper forming) process that uses water. The paper manufactured by the pulp papermaking process is usually a paper that has a structure in which, for example, cellulose fibers derived from wood or the like are intertwined and are partly bonded to one another by a binder (a paper strength additive (starch paste, a water-soluble resin, etc.)).

However, the pulp papermaking, which is a wet method, requires use of a large amount of water and makes it necessary to perform steps of dehydration, desiccation, etc. after paper is formed, so that very large amounts of energy and time are consumed. Furthermore, the used water needs to be appropriately treated as waste water. Therefore, the pulp papermaking process increasingly finds it hard to meet recent requirements of energy saving, environmental protection, etc. Furthermore, apparatuses for use for the pulp papermaking often need large-size utilities for water, electric power, waste water, etc., and therefore are difficult to be miniaturized. In view of these circumstances, it is hoped that a method termed dry method which uses no or little water will be developed as a manufacturing method for paper that replaces the pulp papermaking.

JP-A-2002-144305 discloses a waste paper board obtained by laminating a resin impregnated sheet on a layer-shaped forming obtained by defibrating waste paper in a dry manner and mixing the defibrated material with an adhesive and then subjecting the laminate to heat and pressure.

Some paper sheets or the like are provided with perforations, perforated lines, etc. for the purpose of, for example, making it easy to neatly tear the paper sheets without using scissors or the like or folding the paper sheets at predetermined positions. Such perforations and the like in a paper are often formed subsequently to manufacture of the paper by using another machine apparatus or formed in an added process for forming the perforations within the paper manufacturing process. Circumstances for the need for a machinery arrangement or a process for forming perforations in a paper or the like do not vary regardless of whether the paper is manufactured by the pulp papermaking or by a dry method as mentioned above in conjunction with JP-A-2002-144305.

Furthermore, in order to make it easy to tear (divide) a sheet without using scissors or the like or fold a sheet at a predetermined position, it is not necessarily considered necessary to form perforations or a perforated line.

SUMMARY

An advantage of some aspects of the invention is that a sheet manufacturing apparatus and a sheet manufacturing method capable of manufacturing a sheet that is easy to tear or crease at a predetermined position are provided. Another advantage of some aspects of the invention is that a sheet that is easy to manufacture and easy to tear or crease at a predetermined position is provided.

The foregoing advantages can be at least partially achieved by the following aspects or embodiments of the invention.

A sheet manufacturing apparatus according to an aspect of the invention includes a defibrating unit configured to defibrate in an atmosphere a raw material that contains a fiber, a mixing unit configured to mix in the atmosphere a defibrated material that the defibrating unit has defibrated and a resin, an accumulating unit configured to accumulate a mixture of the defibrated material and the resin that the mixing unit has mixed, a liquid application unit configured to apply a liquid to a portion of an accumulation of the mixture that the accumulating unit has accumulated, and a heating unit configured to form a sheet by heating the accumulation to which the liquid application unit has applied the liquid.

The foregoing sheet manufacturing apparatus according to the aspect of the invention may further include a pressurizing unit configured to pressurize the accumulation, and the liquid application unit is configured to apply the liquid to the accumulation that the pressurizing unit has pressurized.

The forgoing sheet manufacturing apparatus according to the aspect of the invention may further include a cutting unit configured to cut a side end portion of the sheet that the heating unit has formed, the liquid application unit is configured to apply the liquid to at least a portion of a side end portion of the accumulation, and the side end portion of the accumulation corresponds to the side end portion of the sheet.

In the foregoing sheet manufacturing apparatus according to the aspect of the invention, the liquid may contain a coloring material.

A sheet manufacturing method according to another aspect of the invention includes defibrating in an atmosphere a raw material that contains a fiber, mixing in the atmosphere a resin and a defibrated material defibrated by the defibrating of the raw material, accumulating a mixture provided by the mixing of the resin and the defibrated material, applying a liquid to a portion of an accumulation of the mixture accumulated by the accumulating of the mixture, and forming a sheet by heating the accumulation to which the liquid has been applied.

The foregoing sheet manufacturing method according to the aspect of the invention may further include folding a portion of the sheet that corresponds to the portion of the accumulation to which the liquid has been applied and fixing the portion of the sheet by heating the portion.

The foregoing sheet manufacturing method according to the aspect of the invention may further include superposing a portion of the sheet, which corresponds to the portion of the accumulation to which the liquid has been applied, on a different portion of the sheet different from the portion of the sheet or a different sheet different from the sheet, and adhering the portion of the sheet to the different portion of the sheet or the different sheet by heating the portion of the sheet.

A sheet according to still another aspect of the invention is obtained by accumulating an accumulation of a mixture of a fiber and a resin and heating the accumulation. The sheet includes a portion in which bonding between the fiber and the resin is weaker than in another portion of the sheet.

BRIEF DESCRIPTION OF THE DRAWINGS

Referring now to the attached drawings which form a part of this original disclosure.

DETAILED DESCRIPTION OF EXEMPLARY EMBODIMENTS

Exemplary embodiments of the invention will be described below. The exemplary embodiments described below are merely to illustrate examples of the invention. The invention is not limited in any manner by the following exemplary embodiments but encompasses various modifications and the like that can be carried out without departing from the gist of the invention. Note that not all the configurations, components, etc. mentioned below are necessarily essential to the invention.

A sheet manufacturing apparatus according to an exemplary embodiment of the invention includes a defibrating unit that defibrates in the atmosphere a raw material that contains fibers, a mixing unit that mixes in the atmosphere a defibrated material that the defibrating unit has defibrated and a resin, an accumulating unit that accumulates a mixture that the mixing unit has provided, a liquid application unit that applies a liquid to a portion of an accumulation of the mixture that the accumulating unit has accumulated, and a heating unit that forms a sheet by heating the accumulation to which the liquid application unit has applied the liquid.

1. Sheet Manufacturing Apparatus 1.1. Configuration

Figure 1:
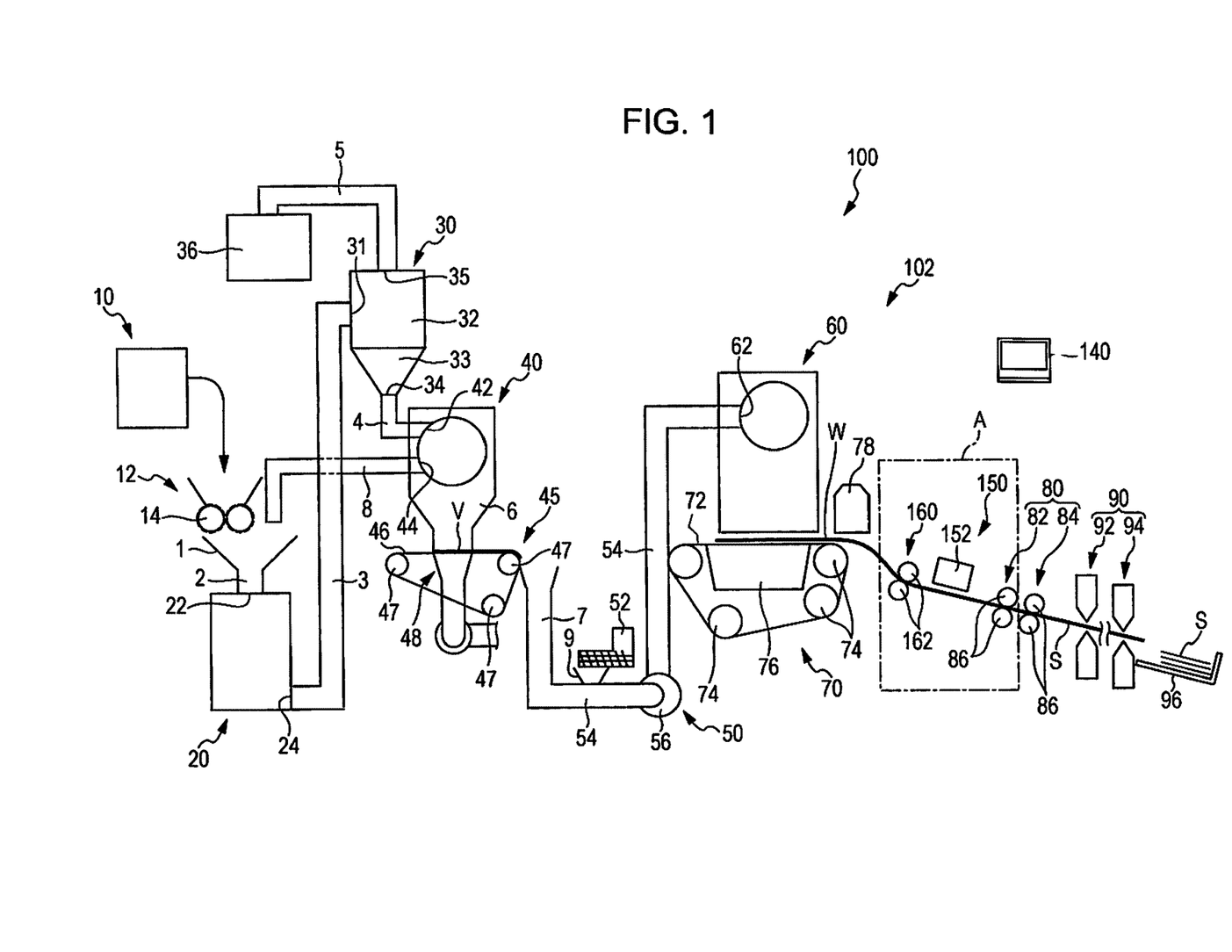
FIG. 1 is a schematic diagram of a sheet manufacturing apparatus of an exemplary embodiment.

First, a sheet manufacturing apparatus according to an exemplary embodiment of the invention will be described with reference to drawings. FIG. 1 is a schematic diagram of a sheet manufacturing apparatus 100 according to the exemplary embodiment.

The sheet manufacturing apparatus 100, as shown in FIG. 1, includes a supplying unit 10, a manufacturing unit 102, and a control unit 140. The manufacturing unit 102 manufactures a sheet. The manufacturing unit 102 includes a coarse crusher unit 12, a defibrating unit 20, a classifier unit 30, a screening unit 40, a first web forming unit 45, a mixing unit 50, an accumulating unit 60, a second web forming unit 70, a sheet forming unit 80, and a cutting unit 90.

The supplying unit 10 supplies a raw material to the coarse crusher unit 12. The supplying unit 10 is, for example, an automatic feeding unit for continuously feeding the raw material into the coarse crusher unit 12. The raw material supplied by the supplying unit 10 is, for example, a material that contains fiber of waste paper, pulp sheets, etc.

The coarse crusher unit 12 cuts or breaks the raw material supplied by the supplying unit 10 into small pieces in air. As for the shape and size of the small pieces, the pieces are, for example, several centimeters by several centimeters. In the example shown in FIG. 1, the coarse crusher unit 12 includes a coarse crusher blade 14. By the coarse crusher blade 14, the raw material fed into the coarse crusher unit 12 can be cut. The coarse crusher unit 12 is, for example, a shredder. The raw material cut by the coarse crusher unit 12 is received by a hopper 1 and then transferred (transported) to the defibrating unit 20 through a pipe 2.

The defibrating unit 20 defibrates the raw material cut by the coarse crusher unit 12. Note that the "defibrate" means to disentangle the raw material (defibration object) in which a plurality of fibers are bonded into separate individual fibers. The defibrating unit 20 also has a function of separating substances, such as resin particles, ink, toner, or a blur-preventing agent attached to the raw material, from the fibers.

The material that has passed through the defibrating unit 20 is referred to as "defibrated material". In some cases, the "defibrated material" contains not only defibrated material fibers that have been disentangled but also resin particles (particles of a resin for bonding fibers) separated from the fibers at the time of disentangling the fibers, coloring agents such as ink or toner, additives such as a blur-preventing material or a paper strength additive. The shape of disentangled pieces of the defibrated material is a string shape or a ribbon shape. The disentangled defibrated material may be in a state in which the material is not intertwined with the other disentangled fibers (independent state) and may also be in a state in which the disentangled defibrated material is intertwined with other disentangled fibers (a state in which so-called "lumps" have been formed).

The defibrating unit 20 performs defibration in a dry process in the atmosphere (air). Concretely, the defibrating unit 20 is an impeller mill. The defibrating unit 20 has a function of sucking the raw material to produce an air stream that discharges the defibrated material. Therefore, due to the air stream that the defibrating unit 20 produces, the defibrating unit 20 can suck the raw material from an introduction port 22 together with the air stream, perform the defibration process, and transport the defibrated material to a discharge port 24. The defibrated material that has passed through the defibrating unit 20 is transferred to the classifier unit 30 through a pipe 3.

The classifier unit 30 classifies the defibrated material that has passed through the defibrating unit 20. Concretely, the classifier unit 30 separates and removes from the defibrated material substances that are relatively small in size or low in density (resin particles, coloring agents, additives, etc.). This process increases the proportion of fibers that are relatively large in size or high in density in the defibrated material.

As the classifier unit 30, an air stream-type classifier is used. The air stream-type classifier produces a swirling air stream to separate substances that are to be classified, according to different centrifugal forces on the substances based on their sizes and densities. By adjusting the speed of the air stream and the centrifugal force, the classification point can be adjusted. Concretely, as the classifier unit 30, a cyclone, an elbow jet, an eddy classifier, etc. may be used. In particular, a cyclone as shown in FIG. 1 is simple in structure and can be suitably used as the classifier unit 30.

The classifier unit 30 includes, for example, an introduction port 31, a cylindrical portion 32 to which the introduction port 31 is connected, an inverted cone-shaped portion 33 provided under and extending continuously from the cylindrical portion 32, a lower discharge port 34 provided in a center portion of a lower portion of the inverted cone-shaped portion 33, and an upper discharge port 35 provided in a center portion of an upper portion of the cylindrical portion 32.

In the classifier unit 30, the air stream introduced through the introduction port 31 and carrying the defibrated material changes into circumferential motion in the cylindrical portion 32. Due to this, the introduced defibrated material is subjected to centrifugal force, so that the classifier unit 30 is able to separate the defibrated material into fibers that are larger in size and higher in density than resin particles and ink particles (first fraction, first classified material) and resin particles, coloring agents, additives, etc. that are smaller in size and lower in density than the fibers (second fraction, second classified material). The first fraction is discharged from the lower discharge port 34 into a pipe 4 and then introduced into the screening unit 40. On the other hand, the second fraction is discharged from the upper discharge port 35 into a receiver unit 36 via a pipe 5.

The screening unit 40 introduces through an introduction port 42 the first fraction (the defibrated material having been defibrated by the defibrating unit 20) that has passed through the classifier unit 30, and then screens the first fraction according to the lengths of the fibers. The screening unit 40 is, for example, a sieve. The screening unit 40 has a mesh (a filter, a screen) and is able to separate the first fraction into fibers or particles that are smaller than the size of the aperture of the mesh (substances that pass through the mesh, referred to as "first screened material") and fibers, undefibrated pieces, and lumps which are larger than the size of the aperture of the mesh (substances that do not pass through the mesh, referred to as "second screened material"). For example, the first screened material is received by a hopper 6 and then is transferred to the mixing unit 50 through a pipe 7. The second screened material is returned from a discharge port 44 to the defibrating unit 20 through a pipe 8. Concretely, the screening unit 40 is a cylindrical sieve capable of being rotated by a motor. The mesh of the screening unit 40 is, for example, a metal mesh, an expanded metal formed by stretching a slitted metal sheet, or a punched metal formed by making holes in a metal sheet with a press machine or the like.

The first web forming unit 45 transports the first screened material that has passed through the screening unit 40 to the mixing unit 50. The first web forming unit 45 includes a mesh belt 46, tension rollers 47, and a suction unit (suction mechanism) 48.

The suction unit 48 is able to draw onto the mesh belt 46 the first screened material having passed through an opening (a mesh opening) of the screening unit 40 and dispersed in air. The first screened material accumulates on the mesh belt 46 in motion to form a web V. The basic configurations of the mesh belt 46, the tension rollers 47, and the suction unit 48 are substantially the same as those of a mesh belt 72, tension rollers 74, and a suction mechanism 76 of the second web forming unit 70 (described later).

The web V, because of having passed through the screening unit 40 and the first web forming unit 45, forms so as to contain a large amount of air and therefore be soft and swollen. The web V accumulated on the mesh belt 46 is fed into the pipe 7 and then transported to the mixing unit 50.

The mixing unit 50 mixes the first screened material having passed through the screening unit 40 (the first screened material having been transported by the first web forming unit 45) and an additive that contains a resin. The mixing unit 50 includes an additive supplying unit 52 that supplies the additive, a pipe 54 for transporting the additive and the first screened material, and a blower 56. In the example shown in FIG. 1, the additive is supplied from the additive supplying unit 52 into the pipe 54 via a hopper 9. The pipe 54 is continuous to the pipe 7.

The mixing unit 50 produces an air stream by using the blower 56 so that the first screened material and the additive can be mixed in the pipe 54 and transported through the pipe 54. Incidentally, the mechanism that mixes the first screened material and the additive is not particularly limited but may be, for example, a mechanism that stirs the first screened material and the additive by using blades that turn at high speed or a mechanism such as a V-shape mixer that utilizes rotation of a container.

The additive supplying unit 52 may be, for example, a screw feeder as shown in FIG. 1, a disc feeder (not shown), etc. The additive supplied from the additive supplying unit 52 contains a resin for bonding a plurality of fibers. At the time point when the resin is supplied, the plurality of fibers are not bonded yet. The resin melts to bond the fibers when passing through the sheet forming unit 80.

The resin supplied from the additive supplying unit 52 is a thermoplastic resin or a heat-curable resin. Examples of the resin include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, etc. These resins may be used singly or in an appropriate mixture. The additive supplied from the additive supplying unit 52 may be in a fibrous state or a powder state.

Incidentally, the additive supplied from the additive supplying unit 52 may contain, besides the resin for bonding fibers, a colorant for coloring the fibers, a aggregation preventing material for preventing aggregation of fibers, or a flame retardant for making the fibers and the like less easy to burn, according to the kind of the sheet to be manufactured. The mixture having passed through the mixing unit 50 (the mixture of the first screened material and the additive) is transferred to the accumulating unit 60 through the pipe 54.

The accumulating unit 60 introduces the mixture having passed through the mixing unit 50 from an introduction port 62, unravels the intertwined defibrated material (fibers), and then causes the unraveled fibers to fall while dispersing in air. Furthermore, if the resin in the additive supplied from the additive supplying unit 52 is fibrous, the accumulating unit 60 unravels the intertwined resin. Due to this, the accumulating unit 60 is able to cause the mixture to accumulate in the second web forming unit 70 with high uniformity.

The accumulating unit 60 in this example is a cylindrical sieve that rotates. The accumulating unit 60 includes a mesh and allows fibers or particles that are contained in the mixture having passed through the mixing unit 50 and that are smaller than the aperture size of the mesh (the fibers or particles that pass through the mesh) to fall. The configuration of the accumulating unit 60 is, for example, the same as the configuration of the screening unit 40.

Note that the "sieve" of the accumulating unit 60 does not need to have a function of screening a specific object. Specifically, the "sieve" used as the accumulating unit 60 means an element that includes a mesh, and the accumulating unit 60 may allow all the mixture introduced into the accumulating unit 60 to fall.

The second web forming unit 70 accumulates the mixture having passed through the accumulating unit 60 so as to form the web W. The second web forming unit 70 includes, for example, the mesh belt 72, the tension rollers 74, and the suction mechanism 76.

The mesh belt 72, while moving, accumulates the mixture that has passed through the opening (aperture of the mesh) of the accumulating unit 60. The mesh belt 72 is supported with tension by the tension rollers 74 and is configured so as not to easily allow the mixture having come through the opening to pass through but so as to allow air to pass through. The mesh belt 72 moves as the tension rollers 74 rotate about their own axes. While the mesh belt 72 continuously moves, the mixture having passed through the accumulating unit 60 continuously falls and accumulates on the mesh belt 72 to form the web W on the mesh belt 72. The mesh belt 72 is made of, for example, a metal, a resin, a cloth, a non-woven fabric, etc.

The suction mechanism 76 is provided below the mesh belt 72 (provided at the opposite side to the accumulating unit 60). The suction mechanism 76 is capable of producing a downward air stream (air stream toward the mesh belt 72 from the accumulating unit 60). Due to the suction mechanism 76, the mixture dispersed in air by the accumulating unit 60 can be drawn onto the mesh belt 72. Therefore, the speed of discharge from the accumulating unit 60 can be made high. Furthermore, due to the suction mechanism 76, a fall path of the mixture can be provided with downward air flow, so that the defibrated material and the additive can be prevented from intertwining during fall.

Due to the accumulating unit 60 and the second web forming unit 70 (a web forming step) as described above, the web W that contains a large amount of air and that is soft and swollen is formed. The web W accumulated on the mesh belt 72 is transported to the sheet forming unit 80.

In the example shown in FIG. 1, a moisture-adjusting unit 78 that adjusts the moisture in the web W is provided. The moisture-adjusting unit 78 is capable of adjusting the ratio between the amounts of the web W and water in the web W by adding water or steam to the web W.

The sheet forming unit 80 shapes the web W accumulated on the mesh belt 72 into a sheet S by pressurizing and heating the web W. In the sheet forming unit 80, because the mixture of the defibrated material and the additive mixed in the web W is heated, a plurality of fibers in the mixture can be bonded by the additive (resin).

The sheet forming unit 80 is, for example, a heating roller (heater roller), a hot press molding machine, a hot plate, a warm air blower, an infrared heater, or a flash fixer unit. In the example shown, the sheet forming unit 80 includes a first bonding unit 82 and a second bonding unit 84, and each bonding unit 82, 84 includes a pair of heating rollers 86. Because the bonding units 82 and 84 are provided as the heating rollers 86 in this example, the web W can be continuously transported while being shaped into the sheet S, in contrast with a configuration in which the bonding units 82 and 84 are provided as platy press apparatuses (flat press apparatuses). Incidentally, the number of heating rollers 86 is not particularly limited.

The cutting unit 90 cuts the sheet S formed by the sheet forming unit 80. In the example shown in FIG. 1, the cutting unit 90 includes a first cutting unit 92 that cuts the sheet S along a direction that intersects the transport direction of the sheet S and a second cutting unit 94 that cuts the sheet S along a direction substantially parallel to the transport direction. The second cutting unit 94, for example, cuts the sheet S that has passed through the first cutting unit 92.

In the foregoing manner, a cut-sheet type sheet S having a predetermined size is formed. The thus obtained cut sheet S is discharged to a discharge unit 96.

1.2. Fiber

In the sheet manufacturing apparatus 100 of the exemplary embodiment, fiber is used as a portion of the raw material. Examples of such fiber include natural fiber (animal fiber, vegetable fiber), chemical fiber (organic fiber, inorganic fiber, organic-inorganic composite fiber), etc. More specifically, the fiber for use in the exemplary embodiment may be cellulose, silk, wool, cotton, hemp, kenaf, linen, ramie, jute, Manila hemp, sisal hemp, fibers from needle-leaved trees, broad-leaved trees, etc. These fibers may be used singly or in an appropriate mixture or may also be used as a regenerated fiber that has been subjected to purification or the like. The fiber may be dry or may also contain or be impregnated with a liquid such as water or an organic solvent. Furthermore, the fiber may be surface-treated in various manners.

As for the fibers contained in the sheet of the exemplary embodiment, if each fiber is independent, an average of diameters of the fibers is greater than or equal to 1 µm and less than or equal to 1000 µm. When a section of the individual fiber is not a circle, the diameter of the individual fiber corresponds to the largest length in a direction perpendicular to the longitudinal direction of the individual fiber, or a circle equivalent diameter which is a diameter of a circle assumed to have an area equal to the sectional area of the individual fiber.

The length of the fibers contained in the sheet of the exemplary embodiment is not particularly limited but, for example, the length of each fiber in its longitudinal direction when the fiber is present as an independent fiber is greater than or equal to 1 µm and less than or equal to 5 mm. Furthermore, as for the mean length of the fibers, the length-weighted mean fiber length thereof is greater than or equal to 20 µm and less than or equal to 3600 µm. Furthermore, the lengths of the fibers may have a dispersion (distribution).

In this specification, the term fiber refers to, in some cases, an individual fiber and, in some other cases, an aggregate of a plurality of fibers (e.g., a state as in cotton). The fiber may be a fibrously disentangled fiber (defibrated material) obtained by subjecting a defibration object to a defibration process. Note that the defibration object refers to, for example, a material whose fibers are intertwined or bonded together, such as a pulp sheet, paper, waste paper, tissue paper, paper towel, a cleaner, a filter, a liquid absorbent, a sound absorber, a cushioning material, a mat, or corrugated cardboard. Furthermore, in this specification, the defibration object may be a sheet according to this exemplary embodiment or the sheet after use (a waste sheet). Furthermore, the defibration object may contain fiber or the like (organic fiber, inorganic fiber, organic-inorganic composite fiber) made of rayon, lyocell, cuprammonium rayon, vinylon, acrylic, nylon, aramid, polyester, polyethylene, polypropylene, polyurethane, polyimide, carbon, glass, etc.

1.3. Resin

In the sheet manufacturing apparatus 100 of this exemplary embodiment, resin is supplied as an additive from the additive supplying unit 52. That is, the additive supplied from the additive supplying unit 52 contains a resin for bonding a plurality of fibers. At the time point when the resin is supplied, the plurality of fibers are not bonded yet. The resin melts to bond the fibers when passing through the sheet forming unit 80.

In this exemplary embodiment, the additive supplied from the additive supplying unit 52 may be, for example, a composite (particle) in which the surfaces of resin particles are at least partly covered with inorganic fine particles. Furthermore, the composite may be used singly or in mixture with another substance as appropriate.

In the sheet manufacturing apparatus 100 of the exemplary embodiment, the resin is supplied from the additive supplying unit 52 and, when passing through the mixing unit 50 and the accumulating unit 60, is subjected to frictional electrification. Then, while the charged resin becomes attached to fibers, the charged resin is accumulated together with the fibers on the mesh belt 72. The charged resin remains attached (electrostatically adsorbed) to the fibers even after the fibers form the web W.

The kind of the resin (ingredient of the resin particles) may be either one of natural resin and synthetic resin and may be either one of thermoplastic resin and heat-curable resin. In the sheet manufacturing apparatus 100 of the exemplary embodiment, the resin is preferred to be solid at normal temperature and, in view of thermally bonding fibers by the sheet forming unit 80, is preferred to be thermoplastic resin.

Examples of the aforementioned natural resin include rosin, dammar, mastic, copal, amber, shellac, dragon's blood, sandarac, colophonium, etc. These may be used singly or in combination as appropriate and may also be modified as appropriate.

Examples of the heat-curable resin of the synthetic resin mentioned above include heat-curable resins such as phenol resin, epoxy resin, melamine resin, urea resin, unsaturated polyester resin, alkyd resin, polyurethane, and heat-curable polyimide resin, etc.

Furthermore, examples the thermoplastic resin of the synthetic resin mentioned above include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, etc.

Furthermore, the resin may be a copolymerized or modified species of resin, and a group of such resins include styrene-based resin, acrylic-based resin, styrene-acrylic-based copolymer resin, olefin-based resin, vinyl chloride-based resin, polyester-based resin, polyamide-based resin, polyurethane-based resin, polyvinyl alcohol-based resin, vinyl ether-based resin, N-vinyl-based resin, styrene-butadiene-based resin, etc.

Incidentally, the resin may contain a colorant for coloring the fiber or a flame retardant for making the fiber and the like difficult to burn. The resin containing at least one of these species can be easily obtained by compounding the at least one species into the resin by a melt-kneading process.

In the mixing unit 50, the fiber and the resin as mentioned above are mixed together. The mixture ratio therebetween can be appropriately adjusted according to the strength, use, etc. of the sheet S to be manufactured. If the sheet S to be manufactured is a sheet for use in offices such as a copy paper sheet or the like, the proportion of the resin to the fiber is greater than or equal to 5% by mass and less than or equal to 70% by mass, and is preferred to be greater than or equal to 5% by mass and less than or equal to 50% by mass from the viewpoint of obtaining a good mixture in the mixing unit 50 and the viewpoint of making the resin less likely to be detached by gravity or the air stream produced by the suction mechanism 76 when the mixture is formed into a sheet shape.

1.4. Liquid Application Unit

Figure 2A:
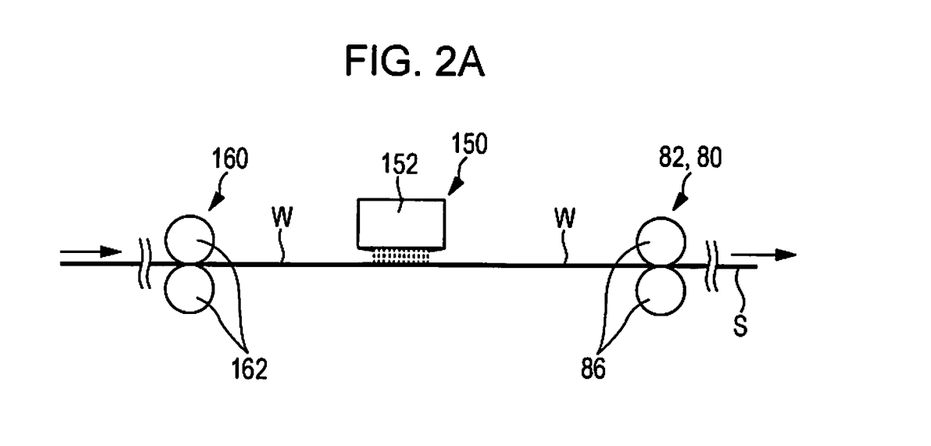
FIGS. 2A and 2B are enlarged schematic diagrams of a portion enclosed by an interrupted line indicated by character A in FIG. 1.
Figure 2B:
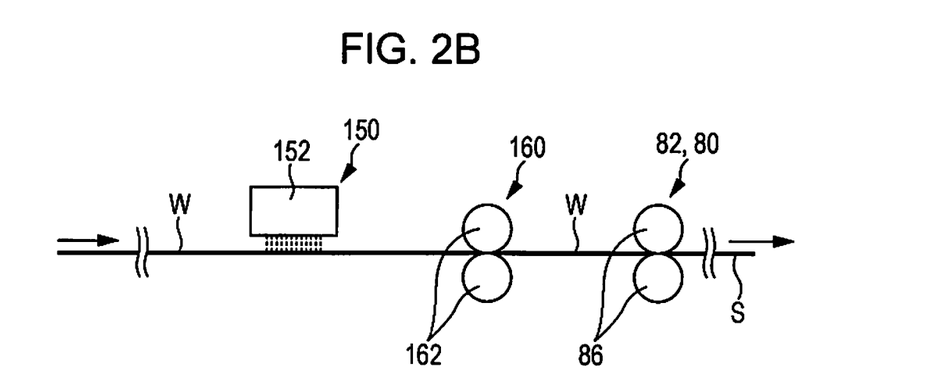

The sheet manufacturing apparatus 100 of the exemplary embodiment includes a liquid application unit 150. FIGS. 2A and 2B correspond to a portion enclosed by an interrupted line indicated by character A in FIG. 1 and show a configuration that includes a pressurizing unit 160, the liquid application unit 150, and a portion of the sheet forming unit 80.

The liquid application unit 150 is provided at a downstream side of a configuration (the accumulating unit 60) that forms the web W in the sheet manufacturing apparatus 100. Furthermore, the liquid application unit 150 is provided at an upstream side of a configuration (the sheet forming unit 80) in which the web W is heated and formed into a sheet S. In the sheet manufacturing apparatus 100 of the exemplary embodiment, the liquid application unit 150 is provided upstream of the first bonding unit 82 (a heating unit) of the sheet forming unit 80.

The liquid application unit 150 applies a liquid to a portion of the accumulation (web W) accumulated by the accumulating unit 60. The liquid application unit 150 is not designed to apply a liquid to the entire accumulation. At least in this respect, the liquid application unit 150 is different from the foregoing moisture-adjusting unit 78 that adjusts the moisture of the web W. Furthermore, the liquid application unit 150 applies the liquid in a different manner from the moisture-adjusting unit 78 in that the liquid that the liquid application unit 150 applies is different in amount and droplet diameter from the water that the moisture-adjusting unit 78 applies. More concretely, the mass of the liquid that the liquid application unit 150 applies to the web W per unit area of the web W is about 10 to 300 times the mass of water per unit area of the web W that the moisture-adjusting unit 78 applies in the form of, for example, mist, and is about 10% to 300% of the mass of the web W per unit area. Furthermore, the diameter of the droplets of the liquid that the liquid application unit 150 applies is about 2 to 100 times the particle diameter of 1 to 10 µm of the mist that the moisture-adjusting unit 78 applies.

The amount of the liquid that the liquid application unit 150 applies to the web W is appropriately set beforehand by taking into account the kinds and amounts of the fiber and the resin in the web W, the heat of evaporation of the liquid, the heat quantity given by the heating unit (the sheet forming unit 80), and the mechanical strength that the liquid-applied region has when the sheet S is formed.

The liquid application unit 150 is made up of, for example, an ink jet type recording head 152. In an example shown in FIGS. 2A and 2B, the recording head 152 is provided. The recording head 152 may be a so-called line type head and may also be a serial type head. If the recording head 152 is a line type head, it becomes unnecessary to provide a configuration for the scanning of the recording head 152, so that the apparatus can sometimes be reduced in size.

The recording method of the recording head 152 is not particularly restricted as long as the liquid can be discharged in the form of droplets from nozzle holes of the recording head 152 and the droplets can be attached to the web W. Examples of the recording method of the recording head 152 include an electrostatic suction method, a method in which droplets are ejected by pump pressure, a method that uses piezoelectric elements, a method in which a liquid is heated by microelectrodes to produce bubbles that eject droplets, etc. The liquid application unit 150 may further include, besides the recording head 152, a casing, a carriage mechanism for the recording head 152, various driving units, various control units, sensors and the like, trays, an operation panel, etc., as appropriate.

Because the liquid application unit 150 is constituted by the recording head 152, any desired amount of the liquid can be very accurately applied to any desired position in the configuration. The liquid application unit 150 may also be constituted by other than the recording head 152, for example, by a liquid pouring nozzle, a spraying nozzle, etc., although not shown in the drawings. Constitution of the liquid application unit 150 by the recording head 152 makes it possible to apply the liquid to the web W with higher position accuracy and is therefore preferable.

The liquid that the liquid application unit 150 applies to the web W is not particularly limited but may be any of water, an organic solvent, a mixture thereof, a solution whose solvent is water or an organic solvent, and a dispersion whose medium is water or an organic solvent. Among these liquids, the liquid to apply to the web W is preferred to be a liquid whose major component is water in view of a large amount of heat required for evaporation (heat of evaporation). That is, the liquid is preferred to be water, an aqueous solution, an aqueous dispersion, etc. Furthermore, as for water, it is preferable to use pure water or ultrapure water such as ion exchanged water, ultrafiltrated water, reverse osmosis-treated water, or distilled water. In particular, a water obtained by sterilizing one of such waters by ultraviolet irradiation or addition of hydrogen peroxide will inhibit the growth of fungi and bacteria over a long period of time and is therefore preferable.

Furthermore, the liquid may contain a coloring material. Examples of the liquid containing a coloring material include water-based color inks. In the case where the liquid application unit 150 is constituted by the recording head 152, the liquid may be an ink-jet ink. As for the coloring material, both pigments and dyes can be used and the concentration of the coloring material is not particularly limited. If the liquid containing a coloring material is used, the liquid may further contain a surface-active agent, a dispersing agent, a fixing agent, etc. that are often used in a typical ink. If the liquid contains a coloring material, the color produced by the coloring material in the manufactured sheet S helps visual recognition of the portions of the sheet S to which the liquid has been applied. Thus, the portions of the sheet S to which the liquid has been applied can serve as colored marks at the time of working on the sheet S.

In the sheet manufacturing apparatus 100 of the exemplary embodiment, the liquid application unit 150 is constituted by the recording head 152 that applies the liquid only from one side of the web W. However, although not shown in the drawings, the recording head 152 may be provided so as to be able to apply the liquid to both side surfaces of the web W. Furthermore, the liquid application unit 150 may include a plurality of recording heads 152 and is not limited to the recording head 152 but may include other devices (liquid nozzles, etc.) in addition to the recording head 152.

1.4. Pressurizing Unit

As shown in FIG. 2A, the sheet manufacturing apparatus 100 of the exemplary embodiment includes the pressurizing unit 160. The pressurizing unit 160 is provided at a downstream side of the configuration that forms the web W (the accumulating unit 60) in the sheet manufacturing apparatus 100. Furthermore, the pressurizing unit 160 is provided at the upstream side of a configuration in which the web W is heated and formed into the sheet S (the sheet forming unit 80). In the sheet manufacturing apparatus 100 of the exemplary embodiment, the pressurizing unit 160 is provided at the downstream side of the accumulating unit 60 and the upstream side of the liquid application unit 150. However, as shown in FIG. 2B, the pressurizing unit 160 may be provided at the downstream side of the liquid application unit 150 and the upstream side of the heating unit (the first bonding unit 82).

The pressurizing unit 160 is a pair of calendar rollers 162 that applies pressure to the web W. As pressure is applied to the web W, the thickness of the web W reduces and the density of the web W increases. The pressurizing unit 160 is able to apply higher pressure to the web W than the first bonding unit 82 (the heating unit) applies.

Although the pressurizing unit 160 is not an essential configuration, the pressurizing unit 160 provided at the upstream side of the liquid application unit 150 increases the density of the web W and therefore the voids between fibers become smaller. Therefore, the liquid that the liquid application unit 150 applies is inhibited from blurring in a flat surface of the web W (from wetting and spreading in the web W). Therefore, the liquid that the liquid application unit 150 applies to the web W becomes less likely to spread, so that a sharper-edged unbonded region 156 can be formed.

1.5. Effects of Application of Liquid

The liquid, when applied to the web W, wets fibers and resin that constitute the web W. When the web W is heated by the heating unit (the first bonding unit 82) after the liquid is applied to the web W, the portion having received the liquid loses heat, which could otherwise be used to soften (melt) the resin, as heat of vaporization required for the liquid to vaporize. Furthermore, in the portion of the web W which has received the liquid, wet surfaces of fibers (or the resin) impede the adhesion (bonding) between the fibers and the resin.

Therefore, in the portion of the web W which has received the liquid, there occurs at least one of a phenomenon in which the resin does not easily soften (melt) and a phenomenon in which the resin does not easily adhere to the fibers regardless of whether or not the resin softens (melts). That is, in the portion of the web W which has received the liquid, it becomes hard for the fibers and the resin to be bonded by the heating unit.

Therefore, if the web W that has partially received the liquid from the liquid application unit 150 passes through the heating unit (the sheet forming unit 80) and therefore is formed into the sheet S, the sheet S will have a portion in which the bonding between the fiber and the resin is strong (a portion that is free from the liquid) and a portion in which the bonding between the fiber and the resin is weak (a portion that has received the liquid). In other words, the sheet manufacturing apparatus 100 of the exemplary embodiment is capable of forming a sheet S that has a portion in which the bonding between the fiber and the resin is weaker than in another portion. In this specification, the portion (region) of the sheet S in which the bonding between the fiber and the resin is weaker than in another portion of the sheet is sometimes referred to as "unbonded portion (region)". The term "unbonded region (unbonded portion)" means a region (portion) in which the bonding between the fiber and the resin is weaker than in another region (portion) as stated above and, more specifically, encompasses a region (portion) in which there is not any bonding between the fiber and the resin and a region (portion) in which there is weak bonding therebetween. That is, the term "unbonded region (portion)" does not necessarily refer to a region (portion) in which the fiber and the resin are not bonded together at all.

The portion of the sheet S in which the bonding between the fiber and the resin is weak has lower mechanical strength than another portion and, therefore, for example, is easy to tear, fold, etc. For example, if the liquid is applied so as to form the shape of a line in a plan view, the sheet S becomes easy to tear along the formed line (see FIG. 3C). Furthermore, if the liquid is applied so as to form the shape of a line in a plan view, the sheet S becomes easy to fold along the formed line (see FIG. 4C).

Figure 3A:
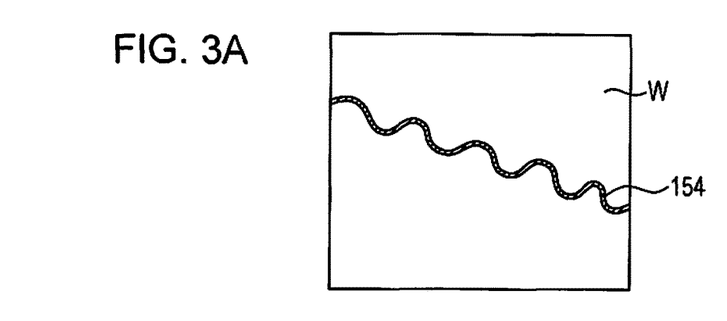
FIGS. 3A to 3C are schematic diagrams illustrating an example of manufacturing a sheet by the sheet manufacturing apparatus and the use of the sheet according to an exemplary embodiment.
Figure 3B:
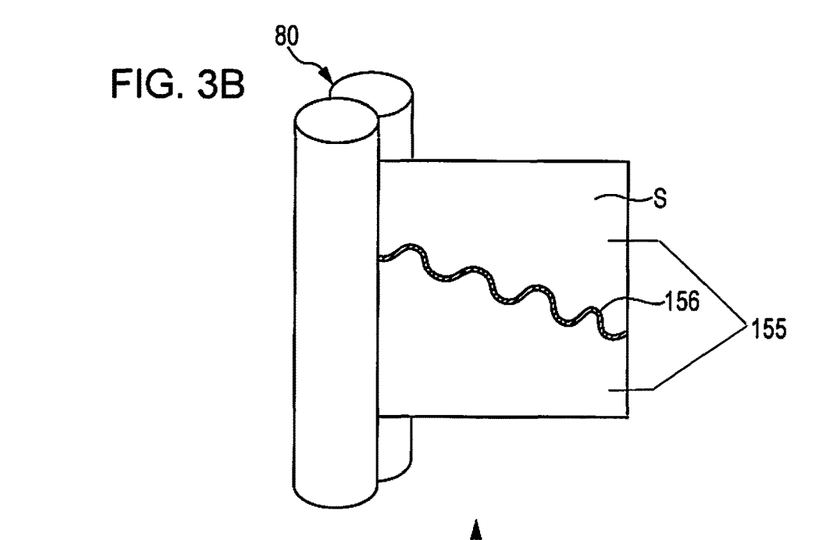
Figure 3C:
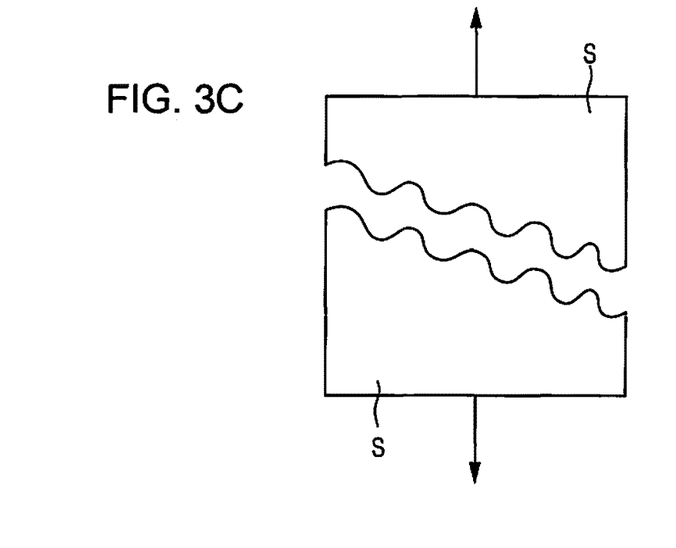

FIGS. 3A to 3C and 4A to 4D are schematic diagrams showing examples of how a sheet S is manufactured by the sheet manufacturing apparatus 100 of the exemplary embodiment. FIG. 3A shows a state in which the liquid has been applied to a web W by the liquid application unit 150 and a liquid-applied region 154 has been formed. FIG. 3B shows a state in which the web W shown in FIG. 3A is being formed into a sheet S while passing through the sheet forming unit 80 (the heating unit) and an unbonded region 156 is being formed at a position that corresponds to the liquid-applied region 154 in the web W. FIG. 3C shows how the sheet S is torn along the unbonded region 156.

As indicated in FIGS. 3A to 3C, the region to which the liquid has been applied becomes an unbonded region 156 and has relatively low mechanical strength when the web W becomes a sheet S. Therefore, the sheet S is easy to tear along the unbonded region 156. In the sheet manufacturing apparatus 100 of the exemplary embodiment, such a portion of weak mechanical strength can be easily formed in the sheet S during manufacture of the sheet S. Therefore, the sheet manufacturing apparatus 100 of the exemplary embodiment can easily form an assistive structure of the sheet S which facilitates the tearing (division) of the sheet S, similar to a related-art structure obtained by forming perforation or a perforated line. According to the sheet manufacturing apparatus 100 of this exemplary embodiment, the position at which an unbonded region 156 is disposed can be set as desired. In this respect, the sheet manufacturing apparatus 100 is advantageous in terms of, for example, design characteristics and the like.

Figure 4A:
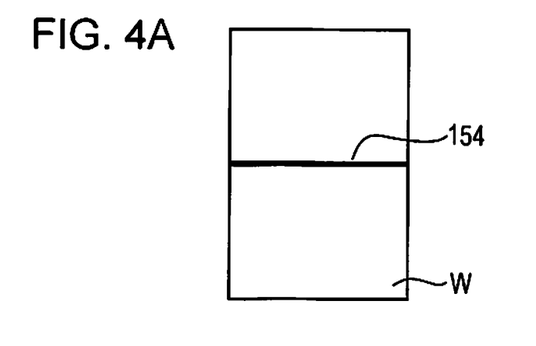
FIGS. 4A to 4D are schematic diagrams illustrating another example of manufacturing a sheet by the sheet manufacturing apparatus and the use of the sheet according to an exemplary embodiment.
Figure 4B:
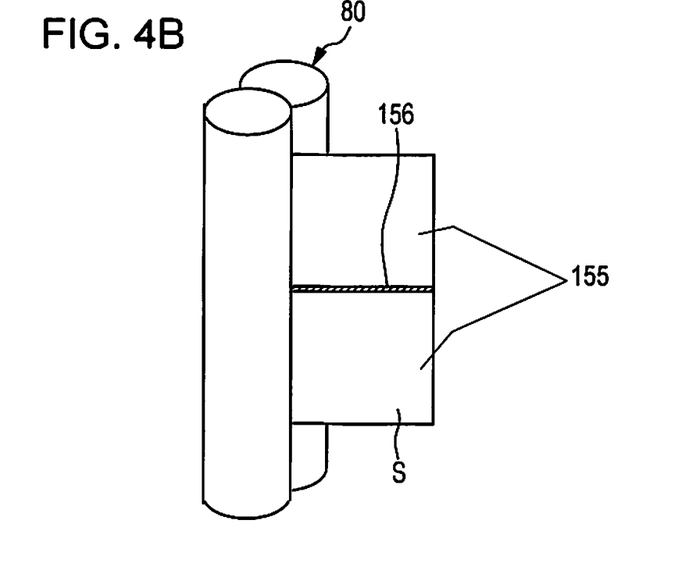
Figure 4C:
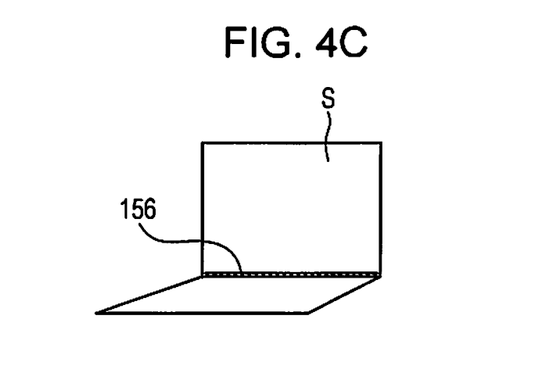
Figure 4D:
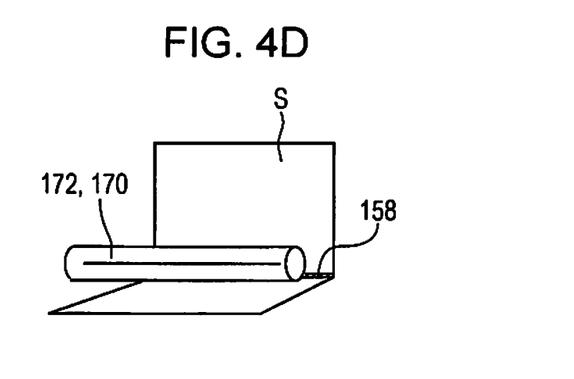

FIG. 4A shows a state in which the liquid has been applied to a web W by the liquid application unit 150 and therefore a liquid-applied region 154 has been formed. FIG. 4B shows a state in which the web W in FIG. 4A has been formed into a sheet S due to passage through the sheet forming unit 80 (the heating unit) and an unbonded region 156 is being formed at a position that corresponds to the liquid-applied region 154 in the web W. FIG. 4C shows a state in which the sheet S has been folded along the unbonded region 156 by using a folding mechanism (not shown), which a fixing unit 170 includes. FIG. 4D shows a state in which the unbonded region 156 is being fixed to form a fixed region 158 by using a heating mechanism, for example, an infrared heater 172, which the fixing unit 170 includes. When the sheet manufacturing apparatus 100 includes the fixing unit 170, the fixing unit 170 may be disposed at a downstream side of the cutting unit 90 and an upstream side of the discharge unit 96, or disposed at a downstream side of the discharge unit 96.

Since the fiber and the resin of the sheet S also exist in the portion in which the bonding between the fiber and the resin is weak, the fiber and the resin in that portion can be bonded by, for example, heating. Therefore, as shown in FIGS. 4A to 4D, if the portion of the sheet S in which the bonding between the fiber and the resin is weak is folded and then is heated by an appropriate method, the sheet S can be fixed in the folded shape. In the sheet manufacturing apparatus 100 of this exemplary embodiment, such a portion of weak mechanical strength can easily be formed during manufacture of the sheet S and, by heating that portion, the fiber and the resin in the portion can be bonded and therefore structurally fixed so as to form the fixed region 158. Incidentally, according to the sheet manufacturing apparatus 100 of the exemplary embodiment, the position at which to dispose the unbonded region 156 can be set as desired. In this respect, too, the sheet manufacturing apparatus 100 is advantageous in terms of, for example, design characteristics and the like. These effects are achieved because the resin in the unbonded region 156, when heated, adheres to neighboring fibers.

Figure 5A:
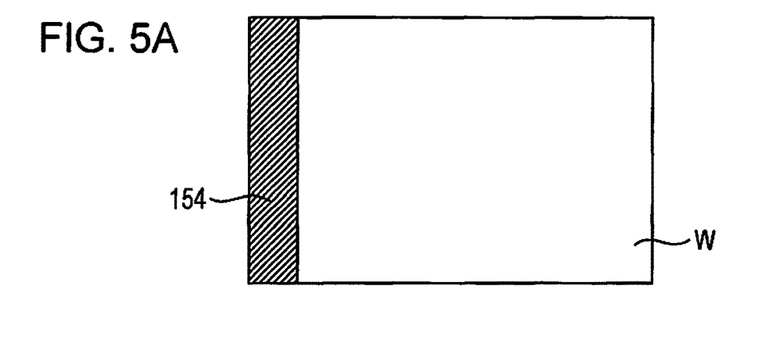
FIGS. 5A to 5C are schematic diagrams illustrating still another example of manufacturing a sheet by the sheet manufacturing apparatus and the use of the sheet according to an exemplary embodiment.
Figure 5B:
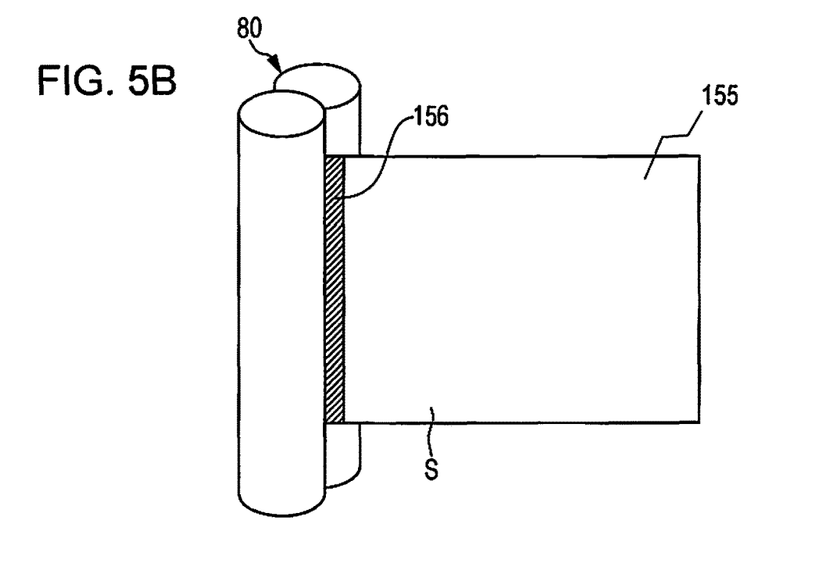
Figure 5C:
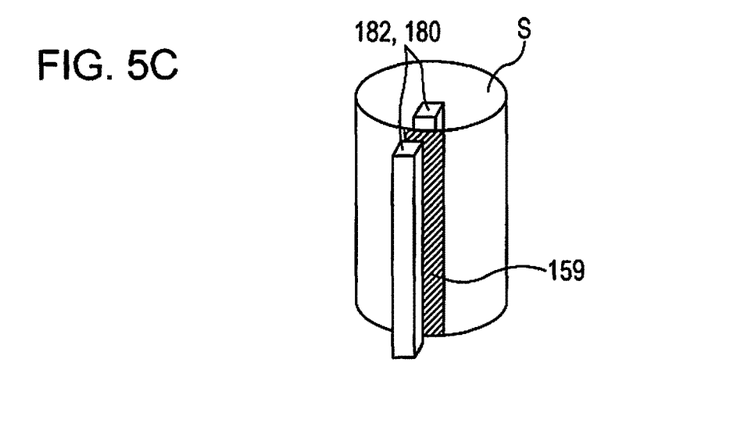

FIGS. 5A to 5C are schematic diagrams showing an example of how the sheet manufacturing apparatus 100 of the exemplary embodiment manufactures a sheet S. FIG. 5A shows a state in which the liquid has been applied to a web W by the liquid application unit 150 and a liquid-applied region 154 has been formed. FIG. 5B shows a state in which the web W shown in FIG. 5A is being formed into a sheet S while passing through the sheet forming unit 80 (the heating unit) and the sheet S has an unbonded region 156 that has been formed at a position that corresponds to the liquid-applied region 154. FIG. 5C shows a state in which the unbonded region 156 of the sheet S is superposed on another portion of the sheet S (a portion of a region 155 in FIG. 5B) by using a superposing mechanism (not shown), which an adhesion unit 180 includes, and, by using a heating mechanism, for example, a heat sealer 182, which the adhesion unit 180 includes, the unbonded region 156 and the other region (the portion of the region 155) are adhered to form an adhered region 159. When the sheet manufacturing apparatus 100 includes the adhesion unit 180, the adhesion unit 180 may be disposed at a downstream side of the cutting unit 90 and an upstream side of the discharge unit 96, or disposed at a downstream side of the discharge unit 96.

The sheet S can be adhered to another sheet (paper, etc.) by, for example, superposing the portion of the sheet S in which the bonding between the fiber and the resin is weak on the other sheet and then heating (heating and pressurizing) the superposed portions as shown in FIG. 5C. In this process, the other sheet may be the sheet S itself (another portion of the same sheet S). In that case, the sheet S can be shaped into a tubular or bag shape or formed into an appropriate three-dimensional shape. Furthermore, the other sheet, although not shown, may also be other than the sheet S. In that case, the sheet S and the other (different) sheet can be stuck together. The adhered region 159 is formed as the resin in the unbonded region 156 is heated to adhere to neighboring fibers. Still further, although in the example shown in FIGS. 5A to 5C, the unbonded region 156 and a region in which the fiber and the resin are bonded are adhered to each other, it should be obvious that adhesion may be made between different portions of the unbonded region 156 or between different unbonded regions 156.

Figure 6A:
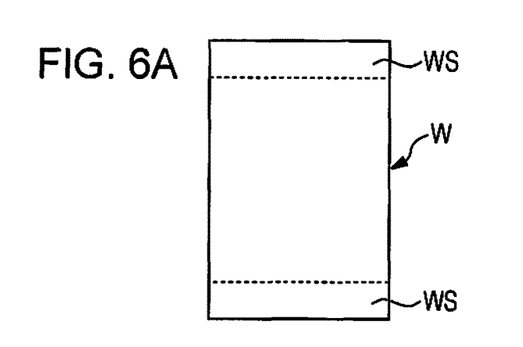
FIGS. 6A to 6D are schematic diagrams illustrating yet another example of manufacturing a sheet by the sheet manufacturing apparatus and the use of the sheet according to an exemplary embodiment.
Figure 6B:
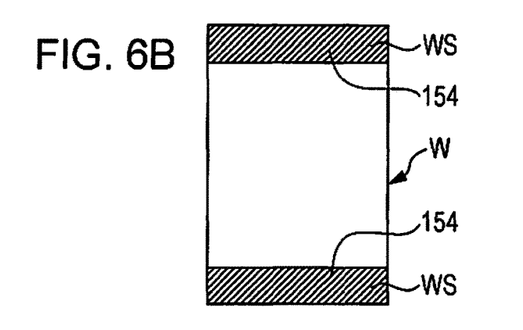
Figure 6C:
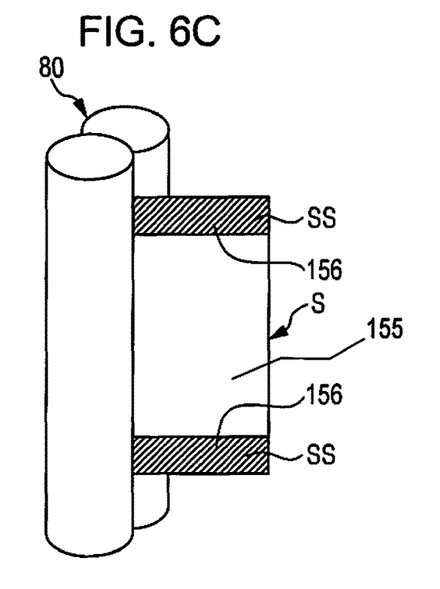
Figure 6D:
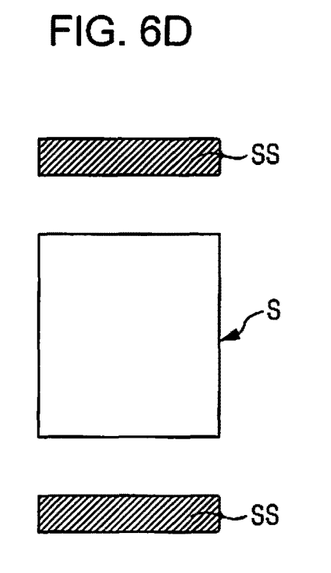

FIGS. 6A to 6D are schematic diagrams showing an example of how the sheet manufacturing apparatus 100 of the exemplary embodiment manufactures a sheet S. FIG. 6A is a diagram showing an example of how a web W and side end portions WS of the web W (corresponding to side end portions SS of the sheet S) are disposed. FIG. 6B shows a state in which the liquid has been applied to the whole (or a portion) of the side end portions WS by the liquid application unit 150 and, therefore, liquid-applied regions 154 have been formed. FIG. 6C shows a state in which the web W is being formed into the sheet S due to passage through the sheet forming unit 80 (the heating unit) and unbonded regions 156 are being formed at positions that correspond to the liquid-applied regions 154 in the web W. FIG. 6D is a diagram showing a state in which the side end portions SS of the sheet S have been cut off by the second cutting unit 94.

The sheet manufacturing apparatus 100 of the exemplary embodiment includes the second cutting unit 94 that cuts the sheet S in a direction parallel to the transport direction as described above. Specifically, the second cutting unit 94 cuts off the side end portions SS of the sheet S (two opposite side end portions of the sheet S in a view from the transport direction) after the sheet S has passed through the first cutting unit 92. The cut-off side end portions SS are separated from the finally manufactured sheet S and are appropriately recovered and reused. For example, the cut-offside end portions SS can be returned to the defibrating unit 20 by a transfer device (not shown) so as to be used as a portion of the raw material. In such a case, the defibrating unit 20 defibrates the side end portions SS as well.

The sheet manufacturing apparatus 100 of the exemplary embodiment is capable of applying the liquid to at least a portion of the side end portions WS of the web W, which correspond to the side end portions SS of the sheet S that has passed through the first cutting unit 92 (the side end portions of the sheet S that have not been cut yet by the second cutting unit 94), as can be understood from FIGS. 6A to 6D. Thus, the side end portions SS include portions (unbonded regions 156) in which the bonding between the fiber and the resin is weak, so that the cut-off side end portions SS can be easily defibrated at the time of defibration thereof for reuse. Therefore, in the case where the side end portions SS are reused as a raw material, the time and energy consumed for the defibration thereof can be cut.

2. Sheet Manufacturing Method

A sheet manufacturing method according to the exemplary embodiment includes a defibrating step, a mixing step, an accumulating step, a liquid applying step, and a heating step. More specifically, the defibrating step defibrates in the atmosphere a raw material that contains fiber. The mixing step mixes, in the atmosphere, resin and the defibrated material provided in the defibrating step. The accumulating step accumulates the mixture provided in the mixing step. The liquid applying step applies a liquid to a portion of an accumulation of the mixture accumulated in the accumulating step. The heating step heats the accumulation to which the liquid has been applied by the liquid applying step so as to form a sheet.

The sheet manufacturing method of this exemplary embodiment can be carried out by, for example, using the sheet manufacturing apparatus 100 described above. For example, the defibrating step can be carried out by the foregoing defibrating unit 20. The mixing step can be carried out by the foregoing mixing unit 50. The accumulating step can be carried out by the foregoing accumulating unit 60. The liquid applying step can be carried out by the foregoing liquid application unit 150. The heating step can be carried out by the foregoing sheet forming unit 80 (the heating unit). The fiber and the resin used in the sheet manufacturing method of the exemplary embodiment are substantially the same as the fiber and the resin described above in conjunction with the foregoing sheet manufacturing apparatus and therefore detailed descriptions thereof will be omitted below.

According to the sheet manufacturing method of the exemplary embodiment, in an unbonded region 156 of a sheet S which corresponds to liquid-applied region 154 of a web W, the resin and the fiber are less easy to bond, so that the mechanical strength of the unbonded region 156 can be made low. Therefore, a sheet S that is easy to tear or crease at the position (unbonded region 156) to which the liquid has been applied can be easily manufactured.

The sheet manufacturing method of the exemplary embodiment may further include a fixing step. The fixing step is a step in which at least the unbonded region 156 of the sheet S is heated to melt (soften) the resin in the unbonded region 156 and therefore bond the resin and the fiber in the unbonded region 156 so that the shape of the portion is fixed to form a fixed region 158. The fixing step can be carried out by using, for example, a non-contact heater device such as an infrared heater, a lamp heater, or a warm air (hot air) heater, a contact type heater device such as a hot press, a heat sealer, or a heat roller, or a combination of such heater devices.

The fixing step can be carried out by, for example, as shown in FIGS. 4C and 4D, deforming the easily foldable and deformable unbonded region 156 of the sheet S into an appropriate shape and heating the unbonded region 156 in the deformed state. If the sheet manufacturing method includes the fixing step, the sheet S folded at a predetermined position and having the folded shape or posture fixed can be easily manufactured.

Furthermore, the sheet manufacturing method of this exemplary embodiment may further include an adhering step. The adhering step is a step in which at least the unbonded region 156 of the sheet S is superposed on another sheet and heated so that the resin in the unbonded region 156 melts (softens) to bond with the fiber in the unbonded region 156, whereby an adhered region 159 is formed and therefore the sheet S and the other sheet are adhered together. The adhering step can be carried out by, for example, using a heater device that contacts the sheets while pressurizing the sheets, such as a hot press, a heat sealer, or a heat roller. Furthermore, a non-contact type heater device, such as an infrared heater, a lamp heater, or a warm air (hot air) heater, may also be used in combination.

The adhering step can be carried out by, for example, as shown in FIG. 5C, superposing the unbonded region 156 of the sheet S on another portion of the sheet S (a portion of the region 155) and heating and pressurizing the unbonded region 156 and the other portion of the sheet S in the superposed state. If the sheet manufacturing method includes the adhering step, adhesion between different sheets or between different portions of the same sheet can be performed.

3. Sheet

The sheet S manufactured by the sheet manufacturing apparatus 100 or the sheet manufacturing method of the exemplary embodiment, as described above, is obtained by accumulating a mixture of fiber and resin and heating the accumulation of the mixture and has a portion in which the bonding between the fiber and the resin is weaker than in another portion of the sheet. The thus formed sheet S is easy to tear or crease along the portion (unbonded region 156) in which the bonding between the fiber and the resin is weaker than in another portion (region 155) of the sheet S. Furthermore, if such deformation of unbonded region 156 of the sheet S is followed by heating the unbonded region 156, the deformation can be fixed. If the unbonded region 156 of the sheet S is superposed on another sheet or a portion of another portion (region 155) of the sheet S and heated, the unbonded region 156 of the sheet S can be easily adhered to the other sheet or the portion of the region 155 of the sheet S.

The sheet S is a sheet that has been formed from at least the fiber and the resin mentioned above as raw material and that has been shaped into a sheet shape, a board shape, a web shape, or a shape that has protuberances and depressions. The sheets in this specification can be classified into paper and non-woven fabric. The paper includes various kinds of paper such as a paper formed into a sheet shape from pulp or waste paper as raw material. Examples of the paper include recording sheets for use for writing and printing, wallpaper, wrapping paper, colored paper, drawing paper, Kent paper, etc. The non-woven fabric is a non-woven fabric having greater thickness or lower strength than paper and includes an ordinary non-woven fabric, fiber board, tissue paper (tissue paper for cleaning), paper towel, a cleaner, a filter, a liquid (waste ink or oil) absorbent, a sound absorbing material, a heat insulator, a cushioning material, a mat, etc. Incidentally, the raw material may be vegetable fiber such as cellulose, chemical fiber such as fibers of PET (polyethylene terephthalate), polyester, etc., or animal fiber such as wool or silk.

Note that the non-woven fabric has large intervals or spaces between fibers (i.e., the sheet of non-woven fabric has low density). On the other hand, the paper has small intervals or spaces between fibers (i.e., the sheet of paper has high density). Therefore, if the sheet S manufactured by the sheet manufacturing apparatus 100 or the sheet manufacturing method of the exemplary embodiment is paper, effects and functions, such as uniformity of the strength of the manufactured sheet, can be more conspicuously realized.

4. Other Regards

In this specification, the term "uniformity" in such an expression as "uniform dispersion or mixture" refers to a state in which in a substance in which two or more kinds or two or more phases of components can be defined, the positions of particles or the like of one component relative to the positions of particles or the like of the other one or more components are consistent throughout the system or are equal or substantially equal among various portions of the system. Furthermore, uniformity of coloration of a sheet or the like or uniformity of color tone thereof refers to a state in which the sheet does not have shades of color but has a consistent shade in a plan view.

In this specification, terms that mean equality in density, distance, dimension, etc., such as "uniform", "the same" and "equal intervals", are used. These terms are meant to encompass the cases where certain values are preferred to be equal but are hard to make equal and therefore will not become equal but deviated from each other due to accumulation of errors, dispersions, etc.

According to the invention, partial omissions in configuration and combinations of the embodiments and modifications are possible as long as the features and effects mentioned in this application are at least partly maintained.

The invention is not limited by the foregoing exemplary embodiments and the like but can be modified in various manners. For example, the invention encompasses configurations that are substantially the same as the configurations described above in conjunction with the exemplary embodiments (configurations that are the same in function, method, and result or the same in purpose and effect as the foregoing configurations). Furthermore, the invention encompasses configurations obtained by replacing unessential portions of the configurations described above in conjunction with the exemplary embodiments with different portions. Further, the invention encompasses configurations that achieve the same operation and effects or accomplish the same purposes as the configurations described above in conjunction with the exemplary embodiments. Still further, the invention encompasses configurations obtained by adding known technologies to the configurations described above in conjunction with the exemplary embodiments.

A sheet manufacturing apparatus according to an aspect of the embodiment includes a defibrating unit configured to defibrate in an atmosphere a raw material that contains a fiber, a mixing unit configured to mix in the atmosphere a defibrated material that the defibrating unit has defibrated and a resin, an accumulating unit configured to accumulate a mixture that the mixing unit has provided, a liquid application unit configured to apply a liquid to a portion of an accumulation of the mixture that the accumulating unit has accumulated, and a heating unit configured to form a sheet by heating the accumulation to which the liquid application unit has applied the liquid.

According to this sheet manufacturing apparatus, in the portion of the sheet to which the liquid has been applied, it is less easy to bond the resin and the fiber, so that the mechanical strength of that portion can be made low. Therefore, a sheet that is easy to tear or crease at a position to which the liquid has been applied can be easily manufactured.

The foregoing sheet manufacturing apparatus according to the embodiment may further include a pressurizing unit configured to pressurize the accumulation and the liquid application unit may apply the liquid to the accumulation that the pressurizing unit has pressurized.

According to this sheet manufacturing apparatus, since the liquid is applied to the accumulation after the accumulation is pressurized, the region to which the liquid is applied is restrained from having a blur or the like. Therefore, a sheet that is easy to tear or crease more sharply at a position to which the liquid has been applied can be easily manufactured.

The forgoing sheet manufacturing apparatus according to the embodiment may further include a cutting unit configured to cut a side end portion of the sheet that the heating unit has heated and the liquid application unit may apply the liquid to at least a portion of a side end portion of the accumulation which corresponds to the side end portion of the sheet.

According to this sheet manufacturing apparatus, the side end portion cut apart from the sheet has a region in which the bonding between the resin and the fiber is absent or weak. Therefore, for example, when the side end portion is to be reused, the side end portion can be more easily defibrated.

In the foregoing sheet manufacturing apparatus according to the embodiment, the liquid may contain a coloring material.

This sheet manufacturing apparatus is capable of manufacturing a sheet that facilitates recognition of a portion to which the liquid has been applied.

A sheet manufacturing method according to another aspect of the embodiment includes defibrating in an atmosphere a raw material that contains a fiber, mixing in the atmosphere a defibrated material defibrated by the defibrating step and a resin, accumulating a mixture provided by the mixing step, applying a liquid to a portion of an accumulation of the mixture accumulated by the accumulating step, and forming a sheet by heating the accumulation to which the liquid has been applied by the liquid applying step.

According to this sheet manufacturing method, in the portion of the manufactured sheet to which the liquid has been applied, it is less easy to bond the resin and the fiber, so that the mechanical strength of that portion can be made low. Therefore, a sheet that is easy to tear or crease at a position to which the liquid has been applied can be easily manufactured.

The foregoing sheet manufacturing method according to the embodiment may further include folding a portion of the sheet to which the liquid has been applied and fixing the portion of the sheet by heating the portion.

According to this sheet manufacturing method, a sheet that has been folded and fixed in the folded shape can be easily manufactured.

The foregoing sheet manufacturing method according to the embodiment may further include superposing a portion of the sheet to which the liquid has been applied on a sheet and then adhering the portion to the sheet by heating the portion.

According to this sheet manufacturing method, different sheets or different portions of the same sheet can be easily adhered.

A sheet according to still another aspect of the embodiment is obtained by accumulating an accumulation of a mixture of a fiber and a resin and heating the accumulation and has a portion in which bonding between the fiber and the resin is weaker than in another portion of the sheet.

This sheet can be easily torn or creased along a portion in which the bonding between the fiber and the resin is weaker than in another portion of the sheet.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
   an impeller mill which defibrates, in a dry process, a raw material that contains a fiber;
   a mixer which mixes a defibrated material that the impeller mill has defibrated and a resin, using an air stream to produce a mixture of the defibrated material and the resin;
   a sieve having an opening through which the mixture passes;
   a belt including an upper side on which the mixture which has passed through the opening is accumulated to form a web;
   a heater which heats the web to form a sheet so that the fiber is bonded by the resin; and
   a nozzle which is arranged between the belt and the heater and which applies a liquid only to a partial portion of the web so that the sheet, which is formed by the heater, has a first portion and a second portion, and bonding between the fiber and the resin in the first portion is weaker than bonding between the fiber and the resin in the second portion.

2. The sheet manufacturing apparatus according to claim 1, further comprising
   a roller which pressurizes the web, the roller being arranged upstream, relative to the nozzle, in a transfer direction of the web, wherein
   the nozzle applies the liquid to the web that the roller has pressurized.

3. The sheet manufacturing apparatus according to claim 1, further comprising
   a roller which pressurizes the web, the roller being arranged downstream, relative to the nozzle, in a transfer direction of the web, wherein
   the roller presses the web to which the liquid is partially applied.

4. The sheet manufacturing apparatus according to claim 1, wherein
   the liquid contains water as a major component.

* * * * *